United States Patent [19]

Yoda

[11] Patent Number: 5,384,785
[45] Date of Patent: Jan. 24, 1995

[54] ELECTRONIC IMAGE INFORMATION SCANNING AND FILING APPARATUS

[75] Inventor: Nobuhisa Yoda, Tokyo, Japan

[73] Assignee: Kabushiki Kaisha Toshiba, Kawasaki, Japan

[21] Appl. No.: 796,840

[22] Filed: Nov. 25, 1991

[30] Foreign Application Priority Data

Nov. 30, 1990 [JP] Japan ................... 2-340394

[51] Int. Cl.⁶ ................... G06F 3/14; G06F 7/02
[52] U.S. Cl. ................... 371/30; 382/10; 364/266.4; 364/265.1; 364/DIG. 1
[58] Field of Search ............ 382/61, 48, 10; 395/147, 200, 600; 364/419; 371/30-32; 370/60, 17

[56] References Cited

U.S. PATENT DOCUMENTS

| | | | |
|---|---|---|---|
| 4,439,859 | 3/1984 | Donnon | 371/32 |
| 4,574,395 | 3/1986 | Kato | 382/61 |
| 4,760,606 | 7/1988 | Lesnick et al. | 382/48 |
| 4,803,643 | 2/1989 | Hickey | 395/147 |

FOREIGN PATENT DOCUMENTS

2140878 5/1990 Japan .

OTHER PUBLICATIONS

Patent Abstracts of Japan, vol. 15, No. 280, Jul. 1991, & JP-A-3 097 365 Apr. 1991.
Patent Abstracts of Japan, vol. 9, No. 185, Jul. 1985, & JP-A-60 054 565 Mar. 1985.
Patent Abstracts of Japan, vol. 11, No. 204, Jul. 1987 & JP-A-62 029 256 Feb. 1987.
Patent Abstracts of Japan, vol. 13, No. 530, Nov. 1989, & JP-A-1 217 471 Aug. 1989.
Patent Abstracts of Japan, vol. 10, No. 241, Aug. 1986, & JP-A-61 072 366 Apr. 1986.
Patent Abstracts of Japan, vol. 12, No. 480, Dec. 1988 & JP-A-63 197 065 Aug. 1988.

Primary Examiner—Thomas G. Black
Assistant Examiner—Jennifer M. Orzech
Attorney, Agent, or Firm—Cushman, Darby & Cushman

[57] ABSTRACT

An electronic filing apparatus is provided in which a logical page number of an image data item is read out from a specified area when the image data item is input and the logical page number is set to correspond to a physical page number determined by the actual input order of the image data items. When the image data is retrieved, the image data items are displayed in the order of the logical page numbers. The registering operation will not be interrupted even when the order of the logical pages is wrong at the input time. Therefore, the registering operation can be continuously effected irrespective of the input order of the image data items and time and labor for interrupting the registering operation when the page order is detected to be wrong at the time of input of the image data items or inputting the image data items again can be reduced.

3 Claims, 10 Drawing Sheets

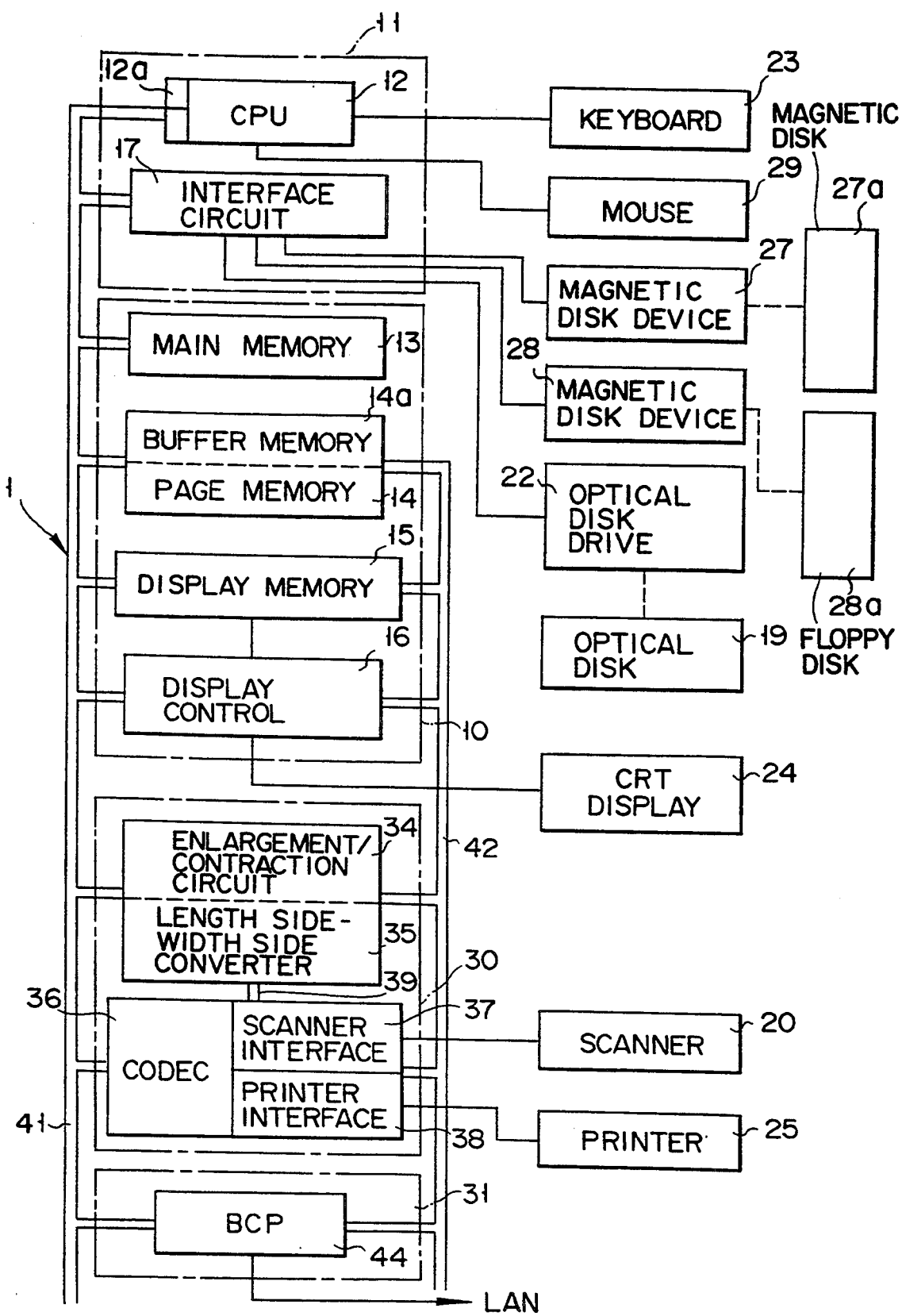
F I G. 1

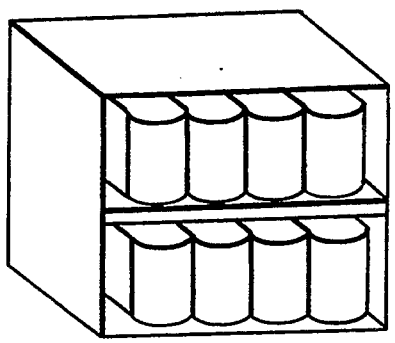
CABINET NAME
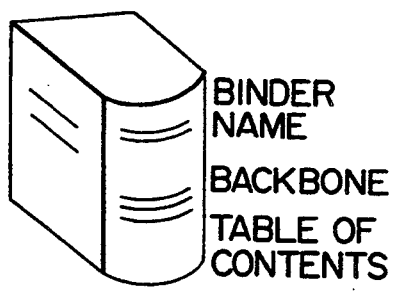
BINDER NAME
BACKBONE
TABLE OF CONTENTS
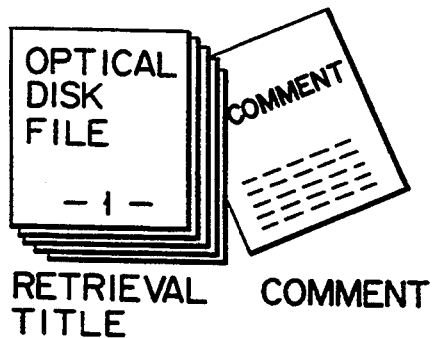
OPTICAL DISK FILE
—1—
RETRIEVAL TITLE
COMMENT
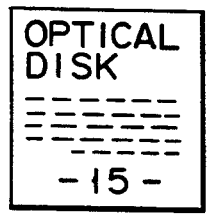
OPTICAL DISK
—15—
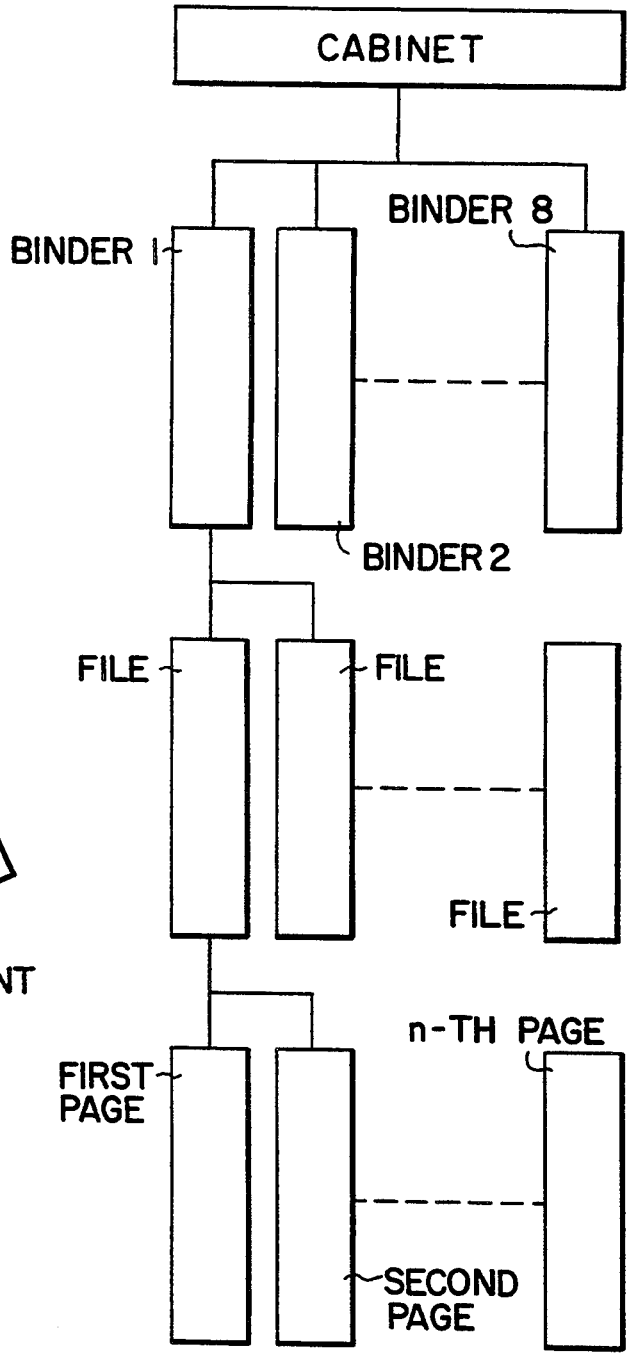
F I G. 2

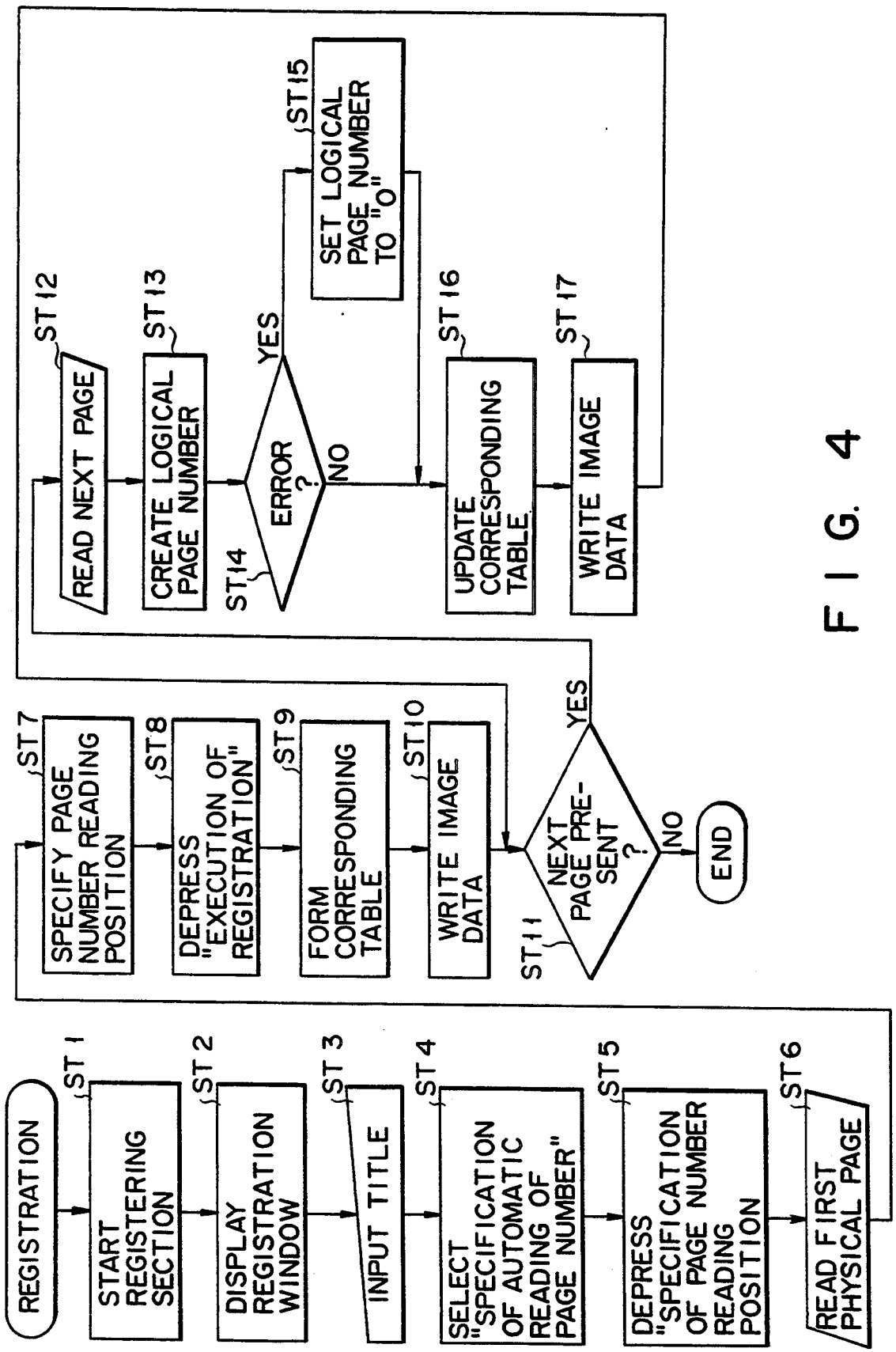
F I G. 4

| REGISTRATION WINDOW | CABINET NAME : LIST OF NAME  BINDER NAME : RESEARCH AND DEVELOPMENT DEPARTMENT |

REGISTRATION CONDITION INPUT TABLE

| TITLE KEY NAME | TITLE |
|---|---|
| NAME | ○○TARO |
| BIRTH DAY | 670401 |
| . | . |
| . | . |
| . | . |

| INPUT OF REGISTRATION PAGE | EXECUTION OF REGISTRATION | SPECIFICATION OF PAGE NUMBER READING POSITION | | END |

F I G. 5

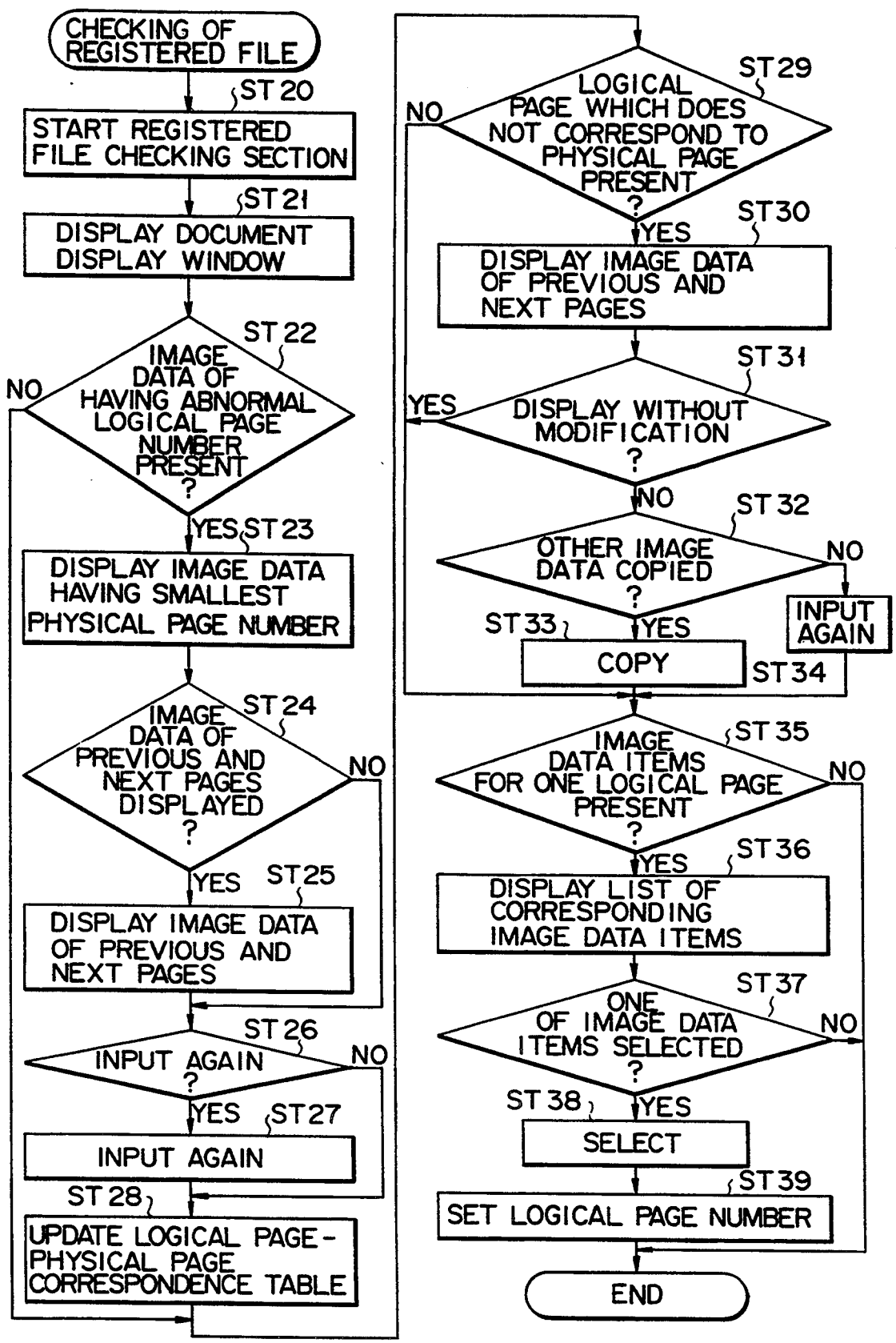
F I G. 6

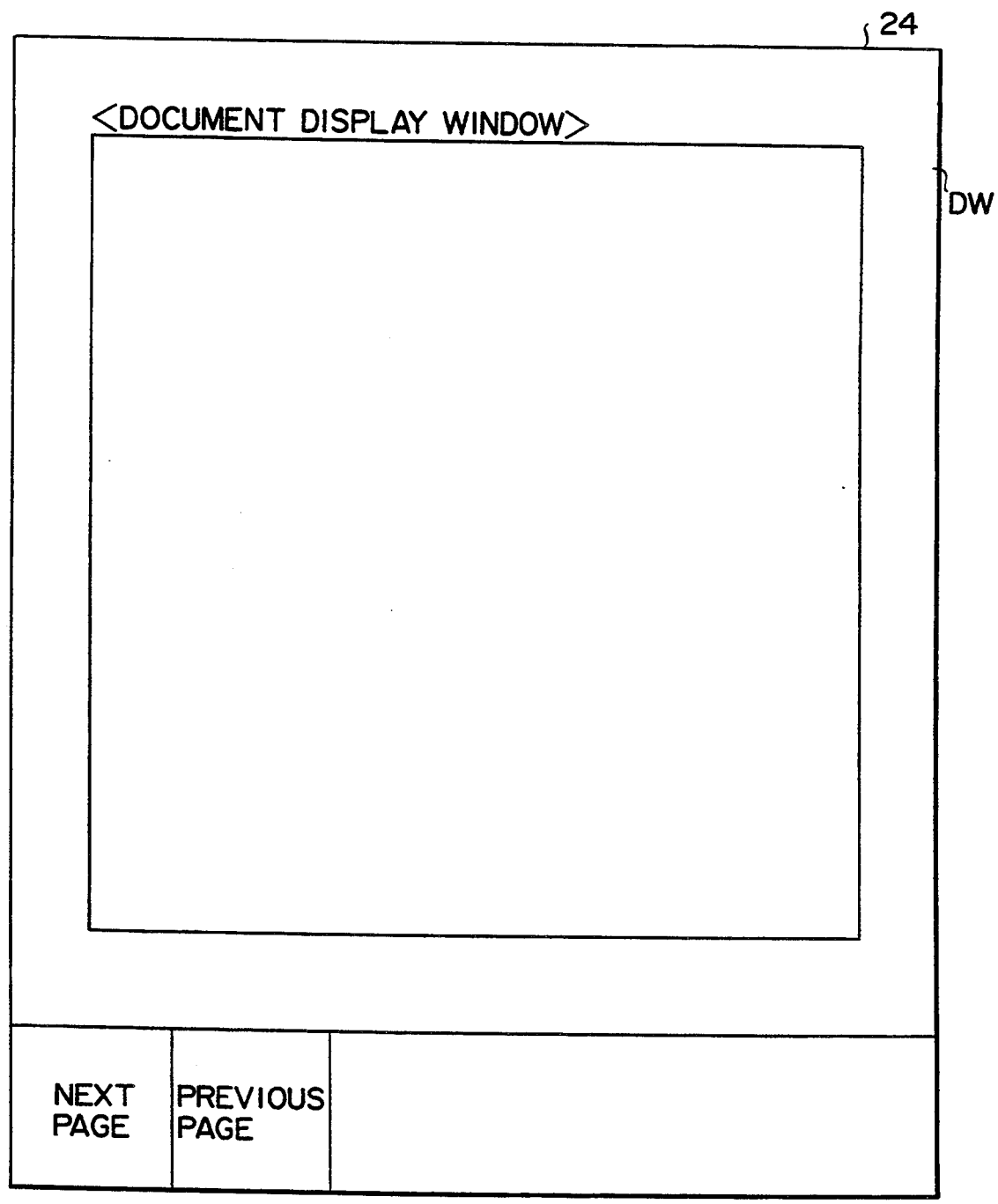
F I G. 7

| RETRIEVAL WINDOW | CABINET NAME : LIST OF NAME BINDER NAME : RESEARCH AND DEVELOPMENT DEPARTMENT ||
|---|---|---|

RETRIEVAL CONDITION INPUT TABLE

| TITLE KEY NAME | RETRIEVAL CONDITION |
|---|---|
| NAME | * |
| BIRTH DAY | * |
| ADDRESS | * |
| . | . |
| . | . |
| . | . |
| . | . |
| . | . |
| . | . |
| PAPER SIZE | A3 |
| PAPER DIRECTION | OBLONG |
| POTATION ANGLE (°) | 90 |
| PAGE POSITION | FIRST PAGE |

NUMBER OF CORRESPONDING CASES : 10

PAGE OUTPUT ORDER MODE : [ LOGICAL PAGE NUMBER ORDER    INPUT PAGE NUMBER ORDER ]

| RETRIEVAL START | DOCUMENT DISPLAY | | END |
|---|---|---|---|

RW

F I G. 9

| LOGICAL PAGE NUMBER | NUMBER OF CORRE-SPONDING PAGES | CORRESPONDING PHYSICAL PAGE NUMBER | |
|---|---|---|---|
| 0 | 5 | 3,5,6,7,9 | ITEM OF ABNORMAL LOGICAL PAGE NUMBER |
| 1 | 1 | 1 | EXAMPLE OF A CASE WHEREIN A PLURALITY OF PHYSICAL PAGE NUMBERS CORRESPOND TO ONE LOGICAL PAGE NUMBER |
| 2 | 2 | 2,8 | |
| 3 | 0 | NULL | EXAMPLE OF A CASE WHEREIN PHYSICAL PAGE NUMBER DOES NOT CORRESPOND TO LOGICAL PAGE NUMBER |
| 15 | 1 | 15 | |

ELECTRONIC IMAGE INFORMATION SCANNING AND FILING APPARATUS

BACKGROUND OF THE INVENTION

1. Field of the Invention

The present invention relates to an electronic filing apparatus, such as an image data storing/retrieving apparatus, for storing or retrieving image data.

2. Description of the Related Art

Recently, an electronic filing apparatus for reading image data of a large number of documents using a scanner (2-dimensional scanning device), storing the read image data in an optical disk, retrieving and reading desired image data stored in the optical disk and outputting the image data to an output device such as a CRT display capable of outputting the image data in a visible form is put to practical use. In the above apparatus, image data of a plurality of pages of documents is managed for each file. In this type of apparatus, when file data is input and registered, image data of each page of the file must be read for each page by use of a scanner. Then, the title of the file and a keyword for retrieval are attached to each file to be registered.

Conventionally, the order of image data items in the file to be registered is set to be the same order in which the image data items have been input irrespective of the order of the pages in the file. Therefore, in order to display the image data items in the same order as that of pages of the file at the time of retrieval, it is necessary to input the image data items in the same order as that of the pages of the file constructed by the image data items, that is, operate the scanner to read the image data items according to the order of the pages of the file.

For this reason, when or before the operator inputs file data, it is a common practice to check the order of the pages. However, when file data of a large number of pages is continuously input, for example, the order of the pages may be frequently reversed, some pages may be erroneously omitted or the same page may be input twice.

Further, in order to check whether or not the image data items of the file of a large number of pages are correctly arranged, that is, to check whether or not the image data items are registered in a correct order, the operator must actually display the image data of each page on the display and therefore much labor and time must be taken for the checking operation.

Even when an automatic paper feeder is attached to the scanner to effect the automatic continuous registration process, the amount of work will be substantially the same as in the case where documents are set into the scanner for each page if the operator is required to check each page. Particularly, even when the automatic continuous registration process is effected in an unmanned environment, it is necessary to visually check all of the pages, while displaying the registered image data of each page after the image data items of all of the pages are registered. It is also necessary to re-register the image data into the optical disk by use of the file editing function or input the image data again when the direction or order of the image data items is detected to be wrong.

Thus, in the conventional electronic filing apparatus, the image data registering process is the most troublesome process in the filing operation for the operator and there is a need to enhance the efficiency of the file registering process.

Further, when the direction or order of the image data items is detected to be abnormal in the registration operation, a troublesome operation of interrupting the registering operation, correcting incorrect input image data and then starting the registration operation again is repeatedly necessary, or the number of pages in which image data is detected to be abnormal are stored and the incorrect image data must be corrected by use of the file editing function or the like after the registration operation is completed.

In order to enhance the efficiency of the file registering operation, various countermeasures have been proposed. For example, in a case where a large number of files are automatically registered, the operator creates only title data and describes and stores the same into a mark sheet or file (for example, floppy disk) before input operation, instead of inputting the title data of the file by use of the keyboard at the time of inputting image data. At the time of inputting image data, the operator sets the mark sheet or floppy disk into the electronic filing apparatus and starts the operation. Then, the apparatus reads the title data, automatically supplies the title to the file to be registered according to the title data and stores the same into the optical disk. When the file is registered by use of the above function of the apparatus, the efficiency of the registration operation can be enhanced because it is not necessary to input the title data by use of the keyboard at the time of registration of the file. However, the operator is required to display each image data item on the display at the time of or after registration in order to check whether or not the image data items are actually input in the correct direction and order and therefore the amount of work necessary for the checking operation is not reduced at all.

An apparatus utilizing the character recognition technique for file registration is proposed. With the apparatus, the operator previously specifies a desired area in input image data to extract data (for example, character series) in the specified area as title characters of the image data, add a title/keyword character series, which is obtained by recognizing the extracted character series and converting the same to code data, to the image data and register the character series together with the image data. That is, it is possible to recognize the drawing number and register the file with the drawing number used as a title. With this apparatus, since the title of the file to be registered is automatically extracted and determined from the image data itself at the time of inputting the image data, it is not necessary for the operator to input the title of the file. Further, when the direction of the input image data is inclined, a title character series may be erroneously recognized since the drawing direction of characters in the title character series specifying area is inclined, and as a result, erroneous input of the image data can be detected. However, in the case of this apparatus, since the character series of the file to be recognized is processed as the title/keyword character series of the file when the file having a plurality of pages is registered, an error in the order of the pages or omission of pages cannot be detected for the file in which the direction of input image data is correct.

As described above, various types of conventional electronic filing apparatuses designed to enhance the efficiency of the registration operation have been developed and proposed, but countermeasures for errors, which may frequently occur when a file of a plurality of pages is continuously registered, have not been taken, and as a result, the operator is required to display the image data of each page over all of the pages on the display at the time of or after registration and visually check the image data for each page. Thus, there is a strong need to enhance the efficiency of the operation of registering the file.

In the prior art, in order to register the file of a plurality of pages and display the image data items in the same order as the actual order of the pages of the file, it is necessary to input image data items in the same order as that of the pages of the file constructed by the image data items. When the order in which the image data items are input is detected to be different from that of the pages of the file, the registration operation must be interrupted or the image data items input in an erroneous order must be input again. Further, in a case where the image data is checked after completion of the registration, the image data items of all of the pages must be displayed and the efficiency of the registration operation will be lowered.

SUMMARY OF THE INVENTION

It is an object of the present invention to provide an electronic filing apparatus in which files can be registered irrespective of the input order of image data items. The image data items, constituting the file data, can be displayed in the same order as the actual order of the pages of the file and the efficiency of the registration operation can be enhanced.

According to an aspect of the present invention, there is provided an data processing apparatus comprising means for inputting a plurality of image data successively, each of the inputted image data including page information; first means for storing inputted image data; means for recognizing the page information in each of the inputted image data; and second means for storing recognized page information and an order in which every image date stored in the first storing means was input by the inputting means while causing the recognized page information and the input order to correspond to each other.

According to another aspect of the present invention, there is provided a data processing apparatus comprising means for inputting a plurality of image data successively, each of inputted image data including page information; first means for storing inputted image data, means for recognizing the page information in each of the inputted image data; second means for storing recognized page information and the input order of each image data stored in the first storing means while causing the recognized page information and the input order to correspond to each other; means for determining whether the page information and the input order correspond to each other; means for displaying the image data including the page information which is determined not to correspond to the input order; and means for enabling the inputting means to re-input the displayed image data.

According to still another aspect of the present invention, there is provided a data processing apparatus comprising means for inputting a plurality of image data successively, each of the inputted image data including page information; first means for storing inputted image data; means for recognizing the page information in each of the inputted image data; second means for storing recognized page information and input order inputted by the inputting means, every image data stored in the first storing means while causing the recognized page information and the input order to correspond to each other; means for determining whether the page information and the input order correspond to each other; means for enabling the inputting means to re-input the image data including the page information which is determined not to correspond to the input order; and means for displaying the image data stored in the first storing means in an order of the page information stored in the second storing means.

In the present invention, since the registration operation can be continuously effected, irrespective of the input order of image data items, by use of the above means, time the and labor taken for interrupting the registration operation because of an erroneous input order of the image data items and re-inputting the image data again can be omitted.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention together with the general description, given above, and the detailed description of the preferred embodiment, given below, to explain the principles of the invention.

FIG. 1 is a block diagram schematically showing the whole construction of an electronic filing apparatus of the present invention;

FIG. 2 is a diagram of the concept concerning the document control;

FIG. 4 is a flowchart for illustrating the flow of the process associated with the registration operation;

FIG. 5 is a diagram showing an example of a format of the registration window;

FIG. 6 is a flowchart for illustrating the flow of the process associated with the operation of checking a registered file in an embodiment of the present invention;

FIG. 7 is a diagram showing an example of a format for the document displaying window;

FIG. 9 is a diagram showing an example of a format for the retrieving window;

DETAILED DESCRIPTION OF THE PREFERRED EMBODIMENTS

Figure 3:
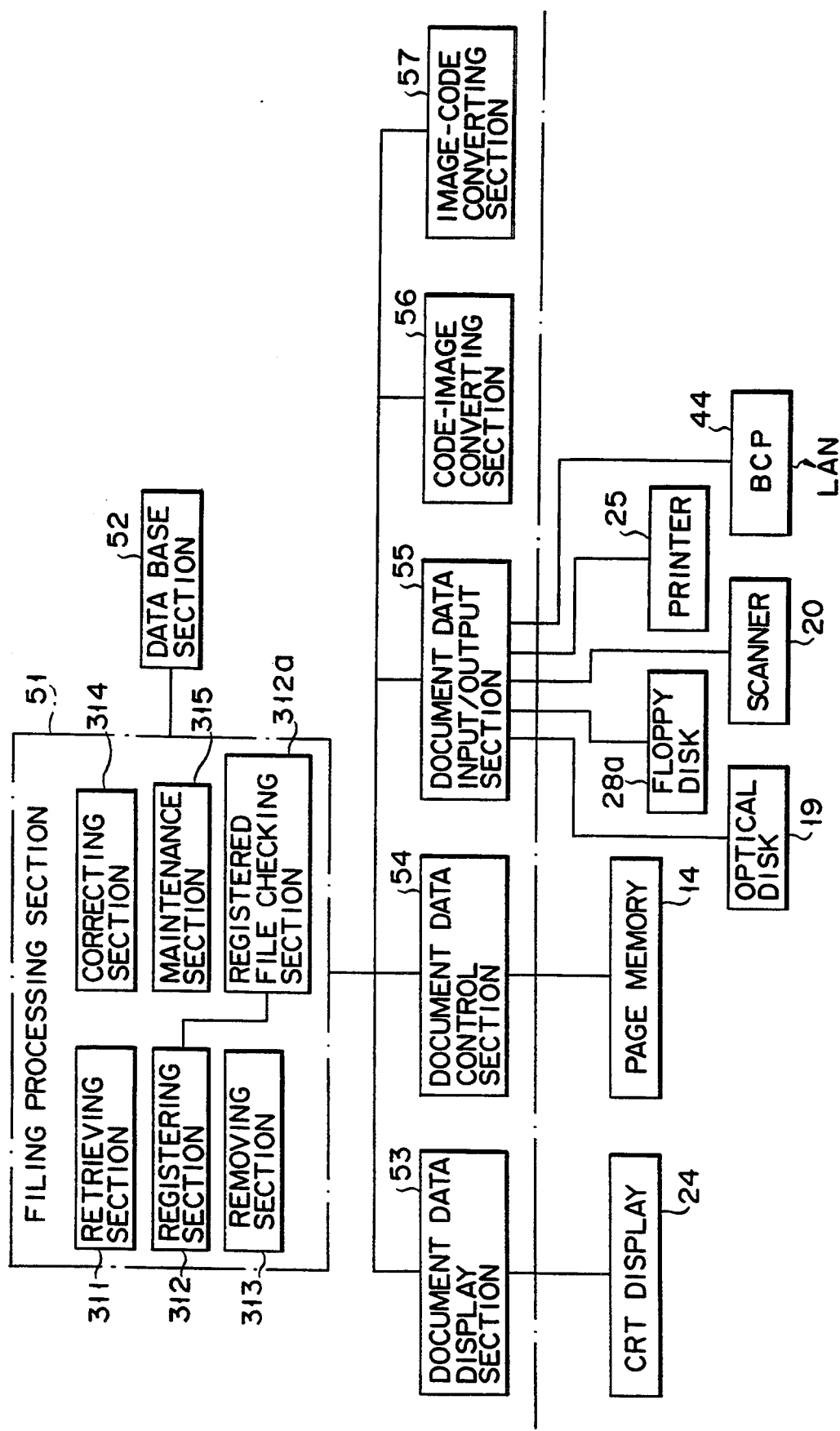
FIG. 3 is a diagram showing an example of a software system.

There will now be described an embodiment of an electronic filing apparatus according to the present invention with reference to the accompanying drawings.

FIG. 1 shows an electronic filing apparatus of the present invention. The electronic filing apparatus includes a memory module 10, control module 11, image data processing module 30, communication control module 31, scanner 20, optical disk device 22, keyboard 23, CRT display 24, printer 25, magnetic disk devices 27 and 28, mouse 29, system bus 41 and image data bus 42.

The memory module 10 includes a main memory 13 for storing various control programs and control data used for, for example, storage and retrieval of image data, a page memory 14 used as an image data memory having a memory capacity corresponding to an amount of image data of a plurality of pages of various-sized original documents, and a display memory 15 and a display control section 16 used as a display interface. A buffer memory area 14a is provided in part of the page memory 14. Data write-in and readout with respect to the buffer memory area 14a are controlled by a counter (not shown). The page memory 14 is used to temporarily store image data to be stored into the optical disk 19 or image data read out from the optical disk 19. The display memory 15 is used to display image data on the CRT display 24. The display memory 15 stores image data actually displayed on the window in the display window on the CRT display 24, that is, image data obtained by subjecting image data of the page memory 14 to the process such as enlargement, contraction, rotation, insertion and white-black inversion. The display control section 16 is used to control the display operation of the CRT display 24.

The control module 11 includes a CPU 12 for effecting various control operations such as storing, retrieving and editing processes of image data and an interface circuit 17 for connecting the CPU 12 to the optical disk device 22, magnetic disk devices 27 and 28 and the like. The CPU 12 is connected to the keyboard 23 and mouse 29. Further, the CPU 12 is provided with an image-code conversion circuit 12a and a code-image conversion circuit 12b. The image-code conversion circuit 12a converts image data (raster data) to code data (vector data). The code-image conversion circuit 12b converts code data in the floppy disk, to be described later, to image data. The image-code conversion and code-image conversion can be effected not only by hardware, but also by software.

The image data processing module 30 includes an enlargement/contraction circuit 34 for subjecting image data to the enlargement/contraction process, a length/width converting circuit 35 for effecting the rotation process by converting the length and width of image data, a compression/extension circuit (CODEC) 36 for effecting the coding process of compressing image data (reducing redundancy) and the decoding process of extending the image data (setting the reduced redundancy back to the original value), a scanner interface 37 for the scanner 20, a printer interface 38 for the printer 25 and an internal bus 39 for connecting the enlargement/contraction circuit 34 and length-width converting circuit 35 to the CODEC 36, scanner interface 37 and printer interface 38.

The communication control module 31 includes a communication interface 44, such as a bus communication processor (BCP), connected to a LAN, for example. The communication control module 31 may be another type, including a universal communication processor (UPC), connected to to an external instrument, such as a personal computer and facsimile connection mechanism (FCP) via an interface (RS-232C, GPIB, SCSI).

The system bus 41 is a control signal bus that connects the control module 11 to the memory module 10, image data processing module 30 and communication control module 31.

The image data bus 42 is a bus for transmitting image data that connects the memory module 10 to the image data processing module 30 and communication control module 31.

The scanner 20 is a 2-dimensional scanning device, for example, and derives an electrical signal corresponding to image data on an original document by scanning the original document with a laser beam in a two dimensional manner.

The optical disk device 22 sequentially stores the image data read by the scanner 22 or the code data read from the floppy disk 28a via the magnetic disk device 28 into the optical disk 19. Further, it retrieves image data, corresponding to display attribute data such as the image size, image direction, rotation angle and the number of pages or retrieval data specified by the keyboard 23 or the like.

The keyboard 23 is used to input inherent retrieval data corresponding to image data constructed as code data and image data stored in the optical disk 19 and to enter various operation commands for storage, retrieval editing processes and the like.

The mouse 29 is used to freely move a cursor (not shown) displayed on the display window on the CRT display 24 in vertical and horizontal directions so as to select or indicate the contents (for example, area specification for image data edition or various modes, or icon) of display in the position of the cursor by generating a command in a desired position.

The CRT display (for example, cathode ray tube display device) 24 displays image data read by the scarruer 20, code data read out by means of the magnetic disk device 28, or code data or image data read out by means of the optical disk device 22. The CRT display 24 is a multi-window type display unit capable of simultaneously displaying four image data items by displaying a maximum of four windows in the display area. Image data items displayed on the respective windows can be independently edited, that is, enlarged, contracted, rotated or scrolled.

The printer 25 prints out image data read by the scanner 20, code data read from the floppy disk 28a, code data and image data read from the optical disk 19, image data displayed on the CRT display 24 and the like.

The magnetic disk device 27 is a hard disk device. The magnetic disk 27a, mounted on the magnetic disk device 27, contains various control programs and retrieval data input via the keyboard 23, code data of one unit for the retrieval data, storage address of the optical disk 19 in which image data is stored, data size, a flag for determining code data or image data, and retrieval/display data (control data) constructed by display attribute data which includes the image size, image direction, rotation angle and the like are stored in the form of a data base (DB). The retrieval/display data is read out from the optical disk and is stored when the optical disk 19 is mounted. The storage address is a logic address, and the physical track address and physical sector address are derived based on the above storage address at the time of access.

The magnetic disk device 28 is a 5.25-inch floppy disk device, for example, and reads a text file (document)

created by a word processor (not shown), a CAD drawing file created by a personal computer (not shown) and code data file such as a work sheet file (drawing data) from the floppy disk 28a. The floppy disk 28a, can be disks for various operation systems (OS).

FIG. 2 shows a document control system of this embodiment. That is, it has a four level hierarchical structure of cabinet, binder, file and page. The cabinet is allotted to one-side surface of the optical disk 19. A maximum of eight binders can be defined in the cabinet and a maximum of 30,000 units of files can be registered in the binder. A title is attached to each file and the construction thereof is defined for each binder unit. The above file is a basic unit of a file and may have a comment (explanation for the file) in addition to the title. The file may be constructed of a maximum of 4095 pages (image data).

Thus, the control system is constructed by taking the degree of matching with the paper file into consideration and the page corresponds to a sheet of paper file (document). In this embodiment, code data (retrieval order information) is controlled at the level of page. That is, the page has image data of one sheet of a paper file, data of one sheet of floppy disk (volume batch data), one file data item, or data obtained by merging the above three types of data with each other. Therefore, a preset program source file (code data) as the first page, a program specification (code data) created by a word processor as the second page and the processing result (image data) as the third page, all which must be independently controlled in the prior art, can be extremely efficiently controlled in a single file, for example.

Next, the structure of a control program or software stored in the main memory 13 of FIG. 1 is explained with reference to FIG. 3.

In FIG. 3, a filing processing section 51 controls a portion of the system and includes a retrieving section 311, registering section 312, registered file checking section 312a, removing section 313, correcting section 314 and maintenance section 315. The retrieving section 311 retrieves a file, which satisfies the retrieval condition input by the operator from the data base section 52, and supplies a table of corresponding file titles (keywords) to the CRT display 24 via the document data display section 53 to display the same. The registering section 312 stores image data input from the scanner 20 or image data (code data) read out from the floppy disk 28a into the optical disk 19 according to the specification made by the operator and stores the image data into an optical disk of another electronic filing apparatus via the LAN. The registered file checking section 312a determines the relation between the physical page number and the logical page number of a registered file for each image data item of the registered file and checks the degree of matching between the page numbers according to the specification made by the operator. That is, it checks whether or not a page, which is erroneously omitted, is present in the registered file or whether an image data item, whose logical page number cannot be determined, is present or not and informs the operator of the checking result so as to suggest that the image data may be corrected if necessary. That is, the image data of a corresponding page may be input again or removed, for example. The removing section 313 removes the file title stored in the data base section 52 according to a to-be-removed file specified by the operator. The correcting section 314 selects a to-be-corrected file specified by the operator and corrects the file title stored in the data base section 52. Selection of the file in the removing section 313 or correcting section 314 is effected by the retrieving section 311. The maintenance section 315 effects the initialization process of the optical disk 19 and the like.

The data base section 52 controls physical data, such as the address and size of real data on the optical disk 19 and each file title; retrieval information of the file; and a logical page-physical page correspondence table, that is, a table indicating the relation between the physical page number based on the input order of image data of each page and the logical page number (page number of each page in the actual file) derived from the result of recognition of a character series described in an area previously specified on each page as retrieval order information, for example, for each page of the file registered on the optical disk 19. Write-in of the retrieval information of the file and the logical page-physical page correspondence table is effected by copying them from the optical disk 19 when the optical disk 19 is set into the electronic filing apparatus. At the time of registering the file, the retrieval information and the logical page-physical page correspondence table are created for each file to be registered and stored into the optical disk 19.

The document data display section 53 permits image data to be displayed in the window of the CRT display 24.

The document data control section 54 controls image data stored in the page memory 14.

The document data input/output section 55 controls the optical disk 19 for storing and reproducing image data, scanner 20 for inputting image data, printer 25 for outputting image data, floppy disk 28a for recording and reproducing code data, and an image data input/output unit such as the BCP 44 for transmitting or receiving image data with respect to an external device via the LAN.

The code-image converting section 56 converts code data such as CAD data to image data.

The image-code converting section 57 converts a character series (image data) in an area previously specified on the image data to code data and converts a page number to code data, such as a numeral, when the page number is described in the previously specified area.

When a power source switch to the electronic filing apparatus is turned on, the filing processing section 51 is first controlled and the maintenance section 315 is triggered to effect the initialization process. After this, information items of "1: retrieval", "2: registration", "3: removal", "4: correction" and "5: maintenance" are displayed on the CRT display 24 by means of the character data display section 53 and, thus, the operator is requested to select one of the five processes.

When one of the displayed information items is selected the operator by using the keyboard 23 or mouse 29, control of the filing processing section 51 is directed to the retrieving section 311 or the maintenance section 315 according to the selected information item.

After this, when a file title is input by the operator using the keyboard 23, a file corresponding to the file title is retrieved from the optical disk 19 or an optical disk provided on another electronic filing apparatus (not shown) via the LAN. The retrieved image data may be displayed on the CRT display 24 by means of the document data display section 53 or output to the printer 25 via the document data input/output section 55 and printed according to specifications made by the operator. Further, when the retrieved data is code data, the process of outputting data from the document data input/output section 55 to the floppy disk 28a is effected.

When the retrieved image data is output from the various output devices described above, the operator is requested to specify the page output order or select one of the "logical page number order output" mode and "input page (physical page) number order output" mode. When image data is output in the "logical page number order output" mode, the output order of the pages of the file becomes the same as the logical page order described in the logical page-physical page correspondence table.

The logical page-physical page correspondence table is explained below in more detail. The table is created by the data base section 52 when a file is registered. The page number actually described on each page of the file to be registered is regarded as a logical page number, the actual input order of image data items is regarded as a physical page number, and the logical pages and the physical pages are set to correspond to each other. Therefore, in the "logical page number order output" mode, image data items are output in the same page number order as the actual page number order of the file irrespective of the actual input order of the image data items of pages of the file. On the other hand, in the "input page number order output" mode, image data items are output in the same order as the physical page number order, that is, the order the image data items are input at the registration time.

Further, the title (keyword) of a file input from the keyboard 23 operated by the operator is registered into the data base section 52. The file title is used to retrieve the file registered in the optical disk 19.

When image data is input, character recognition is effected for data in a previously specified area on the image data if the data is picture image data. Code data of a character drawn in the specified area when the image data is developed is obtained if the data is code data. The, thus, obtained code data is used as the logical page number (retrieval order information) of the page to create the above logical page-physical page correspondence table.

Next, the operation of the above construction is explained.

FIG. 4 shows the flow of the registration operation effected when the operator selects the registration process. The automatic page number reading operation is now explained. For example, assume that the file registration process is specified by the operator. That is, assume that the information item of "2: registration" is selected by use of the keyboard 23 or mouse 29, when information items of "1: retrieval" "2: registration" "3: removal", "4: correction" and "5: maintenance" are displayed on the CRT display 24. Then, the registering section 312 is triggered (ST1). After this, a title registration table (registration condition input table) for inputting the title and retrieval key for the file to be registered is displayed as a registration window WW shown in FIG. 5, for example, on the CRT display 24 by means of the document data display section 53 (ST2).

In the registration window WW, columns for indicating the binder name and cabinet name of a to-be-registered file along with a title key list can be displayed. Titles of the to-be-registered file can be input beside corresponding title keys (ST3). Further, a portion for indicating the presence or absence of the "page number automatic reading specification" is set below the title key list. In this embodiment, "YES" is selected for the "specification" by the operator.

In the lowermost position of the registration window WW, four function keys of "input of registered page", "execution of registration", "setting of page number reading position" and "end" are arranged. In this case, after the title of a file corresponding to the title registration display and a plurality of original documents constructing a file are set in the scanner 20, the function key of "setting of page number reading position" is depressed (ST5). Then, the registering section 312 reads and receives data of the first physical page of a to-be-registered file from the scanner 20, if the image data is picture image data (ST6), writes and the image data into the page memory 14, then displays the image data on the CRT display 24. At this time, the read image data is controlled by the document data control section 54.

Then, the operator is inquired to specify a rectangular area that includes the page number region. After this, the positions of either the left upper or right lower corner of an area in which the page number is described on the image data is specified by the operator using the mouse, for example (ST7). In this case, the operator can easily confirm the area specified by the operator by emphasizing the specified rectangular area on the display.

Next, the function key of "execution of registration" is depressed by the operator (STS). Then, the converting process for the specified area is effected by the image-code converting section 57 and the logical page number described in the area is derived as code data. After this, the logical page number and file title are transferred from the document data control section 54 to the data base section 52 under the control of the registering section 312.

In the data base section 312, corresponding values are written into the logical page-physical page correspondence table of the file (ST9). In this case, the logical page number is a desired number obtained by the character recognition or abnormal logical page number and the physical page number is set to "1", since the image data corresponds to the original document of the first physical page.

A logical address on the optical disk 19, on which image data is to be stored, is supplied to the registering section 312. Then, the above image data is written into the, thus, determined location on the optical disk 19 by the document data control section 54 (ST10).

After this, a document of the next page of the file set in the scanner 20 (ST11) is read as the second physical page (ST12) and the character recognition for setting the character in the specified area as the logical page number of the file is effected (ST13).

When an error such as irrecognizable condition occurs at the time of character recognition and the image data becomes discontinuous (ST14), the logical page number of the image data is set to "0" (ST15) and the registering process is continuously effected. In the case of this embodiment, the number, which is effective as the logical number, is a natural number equal to or larger than "1". Therefore, the value "0" lies outside the range of the ordinary (effective) logical page numbers and is an abnormal logical page number which is set only when an error has occurred at the time of character recognition. In this example, when the result (code data) of recognition of the input image data is actually "0", the abnormal logical page number "0" is set. Then, the logical page number and file title are transferred to the data base section 52 in the above-described manner.

In the data base section 52, the logical page-physical page correspondence table is updated based on the transferred data (ST16).

After this, an image data item of the second physical page is written onto the optical disk 19 in the above-described manner (ST17).

Thus, image data items of the third and succeeding pages are registered in the same manner. Then, an image data item of a final page, for example, image data corresponding to the final one of the documents set in the scanner 20 is written into the optical disk 19 and the registering process is completed. Thus, during file registration, the operator is not required to check the image data of each page in the registering operation.

When the registration process is completed, the registered file checking process is effected in the filing processing section 51.

In this embodiment, the registered file checking process includes the following three checking operations, for example.

First, as the first checking operation, it is checked whether the logical page number of each image data item in the registered file is set to an abnormal logical page number. That is, it is checked whether there is an image data item whose logical page number is set to "0". In this example, the logical page number of an image data item is set to "0" when an abnormal state, such as a page number recognition error, has occurred in the registering process.

As the second checking operation, it is checked whether a normal logical page number, which does not correspond to a physical page number, is present or not. That is, whether a logical page number, which is not an abnormal logical page number, is present or not. That is, it is checked whether the logical page number recognized in the registering process is omitted from the entire portion of the file.

As the third checking operation, it is checked whether a normal logical page number corresponding to a plurality of physical page numbers is present or not. That is, it is checked whether the same page number is described on respective pages of a plurality of image data items in the same file.

Next, the flow of process of the above checking operations for the registered file is explained with reference to FIG. 6. First, the file registering process is completed. The registered file checking section 312a is started in the filing processing section 51 (ST20). Then, a document display window DW shown in FIG. 7 is displayed on the CRT display 24 (ST21). After this, a process for the first checking operation is effected. That is, whether the logical page number of a data item in the file, which is set to an abnormal logical page number, is present or not (ST22) is checked by effecting the operation by the registered file checking section 312a for referring to the logical page-physical page correspondence table controlled by the data base section 52. Then, a physical page number corresponding to the logical page number "0" can be detected. It is possible that a plurality of physical page numbers may be set and detected.

If corresponding data items are detected, the file correcting process for the physical page numbers thereof is effected in the following manner. First, the detected image data item that has the smallest physical page number is displayed on the CRT display 24 (ST23). Then, the operator is inquired as to whether image data items having pages input immediately before and after the page of a to-be-corrected image data item in the input order, that is, an image data item having a physical page number larger than the physical page number of the to-be-corrected image data item by 1 and an image data item having a physical page number smaller than the physical page number of the to-be-corrected image data item by 1 are to be displayed (ST24). Even if the operator cannot understand the to-be-corrected image data item, the operator may easily guess whether the image data item to be corrected belongs between the displayed image data items (ST25). Thus, the correction efficiency can be enhanced.

If the operator determines that image data items having physical page numbers immediately before and after the to-be-corrected image data item are to be displayed, the physical page numbers immediately before and after the to-be-corrected image data item are derived. Then, storage addresses of the image data items of the physical page numbers on the optical disk 19 are referred to and corresponding image data items are read out from the optical disk 19 according to the storage addresses. The readout image data items are transferred to the display memory 15 and stored therein. As a result, three successive image data items, that is, the to-be-corrected image data item and the image data items having physical page numbers immediately before and after the to-be-corrected image data item are displayed on the CRT display 24.

Next, the operator is inquired as to whether the to-be-corrected image data item is to be input again (ST26). For example, when noises are contained in the input image data item or if the operator thinks it necessary to input the image data item again, a corresponding original document is set into the scanner 20 to input the image data item again if the image data item is picture image data (ST27). When the image data item is re-inputted, the image data item, which has been displayed, is removed from the file and the to-be-corrected image data item is replaced by a newly input image data item.

If it is not necessary to re-input image data, the operation of inputting image data again is not effected.

While the above image data items are being displayed on the CRT display 24, the operator is inquired as to the position into which the to-be-corrected image data item is to be inserted. In this case, the position is specified by specifying the relative page position of another image data item, for example, the position immediately before or after an image data item of the previous or next page of the displayed image data item in view of the physical page number, or directly specifying the position of the logical page number into which the image data item is to be inserted. Then, the logical page number of the to-be-corrected image data item is changed from "0" to the specified logical page number by the registered file checking section 312. Also, the logical page-physical page correspondence table controlled by the data base section 52 is updated based on the above logical page number change (ST28).

When the operator has determined that the logical page number of the to-be-corrected image data should not be changed, the logical page number of the image data is kept at "0" and the table is not updated. Then, a process of correcting the next to-be-corrected image data item is effected.

When the process of correcting the logical page numbers of all of the image data items having abnormal logical page numbers is completed, the second checking operation by the registered file checking section 312 is initiated. That is, the operation of checking whether an effective logical page number, which does not correspond to any physical page number is present or not (ST29), is effected by referring to the logical page-physical page correspondence table. By this checking operation, it is possible to detect a case wherein a page is omitted from the registered file.

In this case, image data items of logical page numbers immediately before and after the to-be-corrected logical page number are displayed on the CRT display 24 (ST30) and the operator is inquired as to whether an image data item corresponding to the omitted logical page number is to be newly input or whether an image data item having the abnormal logical page number is transferred (copied) (ST32, ST33), or whether no modification is to be made (ST31).

In the case of newly inputting image data, corresponding image data is input again in the same manner as described before (ST34).

In the case of transferring image data, a list of image data items having the abnormal logical page number "0" is displayed on the CRT display 24. Then, one of the image data items is selected by the operator and a to-be-corrected logical page number is set to correspond to the physical page number of the selected image data item.

When the process for all of the to-be-corrected logical page numbers by the second checking operation is completed, the third checking operation is effected.

In the third checking operation checks whether a plurality of physical page numbers are allotted to a single logical page number by referring to the logical page-physical page correspondence table (ST35). That is, it is checked whether the same image data items are registered more than once or not or whether or not the same page number is described on a plurality of different image data items of the same file.

As a result of the checking operation, a list of to-be-corrected image data items is displayed on the CRT display 24 (ST36), the operator is queried as to whether one of the image data items should be selected (ST37, ST38). A logical page number is attached to the selected image data item (ST39) and the remaining image data items are registered as image data items having the logical page number of "0", or no modification is made. Then, the correcting process is effected according to the specification of the operator.

Two types of function keys (display control commands) of "previous page" and "next page" are prepared in the lowermost portion of the file display window DW shown in FIG. 7 and the following processes are effected by selectively specifying one of the function keys.

The function key of "next page" is used to read an image data item of the next page of the displayed image data item and display the readout image data item on the file display window DW. If, at this time, the displayed image data item is of the final page of the file, "no next page" is displayed if the mode is not changed in any page output order mode.

That is, when the function key of "next page" is specified, a next page inputting request is supplied from the document data display section 53 to the retrieval section 311. At this time, if the "logical page number order output mode" is set, the retrieval section 311 reads image data of a next logical page number of the page which has been displayed from the optical disk 19 and stores the readout image data into the page memory 14, derives the page memory index (which is hereinafter referred to as PMID) thereof and transfers the same to the document data display section 53. When the document data display section 53 receives the PMID of the next page, image data stored in the page memory 14 and corresponding to the PMID is displayed on the file display window DW.

The function key of "previous page" is used to display an image data item of a page preceding the displayed image data item on the file display window DW. If, at this time, the displayed image data item is of the first page of the file, no process is effected in any page output order mode if the mode is not changed.

The control flow of this case is the same as that of the case of the "next page" and the explanation thereof is omitted.

By using the above function, the operator can sequentially display image data items of respective pages of the registered file so that an error in the input order can be checked while visually observing image data items of respective pages as in the prior art.

Next, the display operation using the above function is explained.

Figure 8:
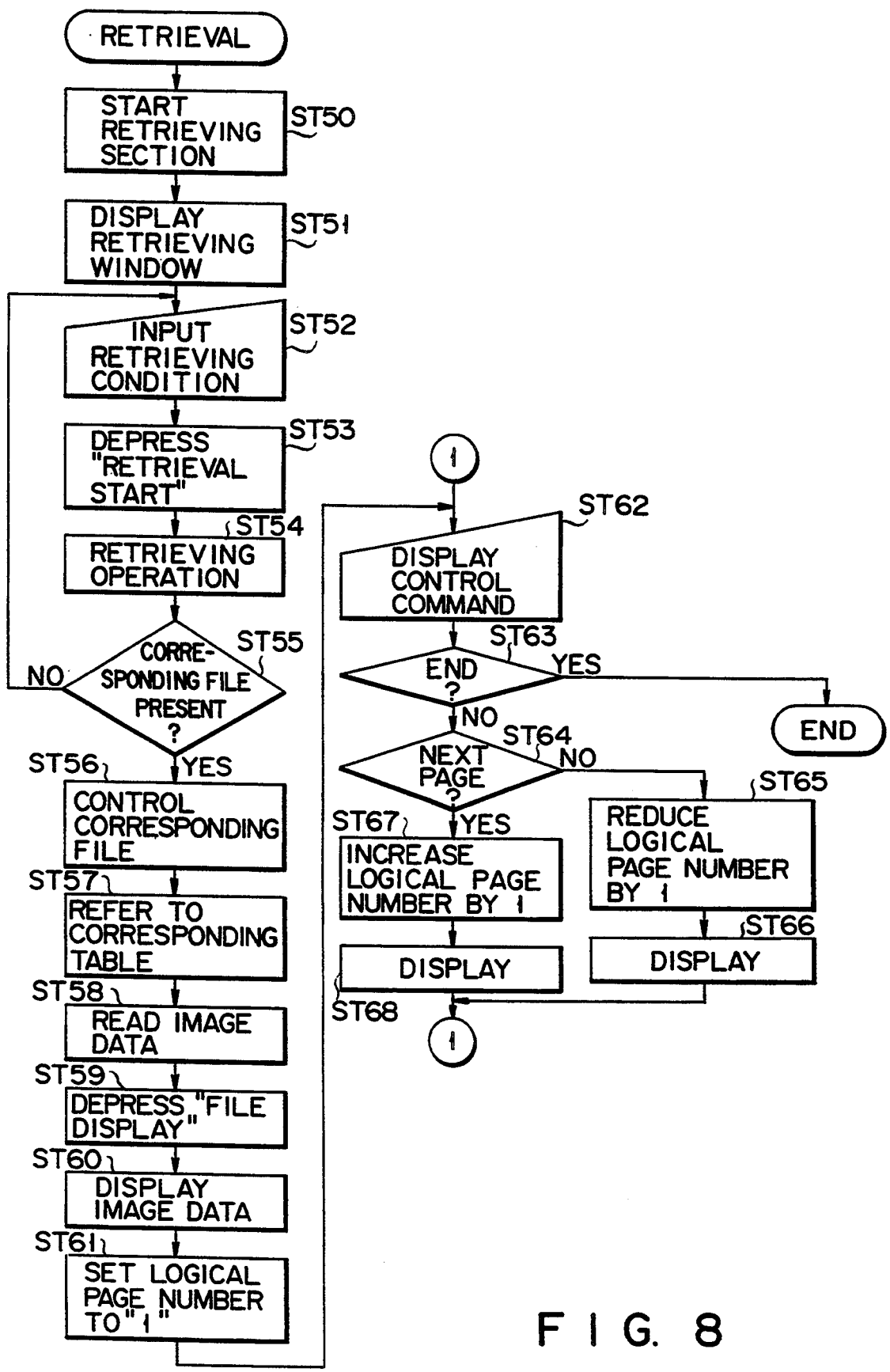
FIG. 8 is a flowchart for illustrating the flow of the process associated with the retrieval displaying operation.

FIG. 8 shows an example of an operation effected when the retrieval displaying process is selected by the operator.

For example, assume now that the information of "1: retrieval" displayed on the CRT display 24 is selected by the operator (ST50). Then, control for the retrieval section 311 starts to be effected. After this, "what optical disk drive ?" is displayed on the CRT display 24 (ST51), and the operator is inquired as to what file in the optical disk 19 of what apparatus is to be retrieved. Further, the operator inputs the optical disk drive number, a binder name defined in the optical disk 19 is read out by accessing the optical disk 19 and data base section 52. The binder name list is displayed on the CRT display 52, and the operator is inquired as to "what binder ?".

When the operator specifies the binder number by using the keyboard 23 or mouse 29, the file title structure of the binder is derived by means of the retrieval section 311, and the retrieval window RW shown in FIG. 9 is displayed on the CRT display 24. A retrieval condition input table for inputting the retrieval condition is displayed in the retrieval window RW (ST52). In addition, a page output order mode setting area for setting the page order in which image data items of respective pages of the file detected as the retrieving result are output is displayed in the retrieving window RW. In this embodiment, there are two modes being "logical page number order output mode" and "input page number order output mode".

In the "logical page number order output mode", image data items of respective pages are displayed or printed in the logical page number order derived by the image-code conversion from the image data items of respective pages at the time of file registration. On the other hand, in the "input page number order output mode", image data items of respective pages are displayed or printed in the physical page number order of the file or the order in which image data items are input at the time of file registration. In this example, assuming that the former case of the "logical page number order output mode" is selected, the operation is further explained.

When the operator inputs the retrieval condition of a desired file into the retrieval condition input table and specifies the "retrieval start" (ST53), the operation is started (ST54). When a file satisfying the condition is detected, the number of corresponding files is displayed (ST55).

At this time, the document display window DW shown in FIG. 7 is displayed on the CRT display 24 in addition to the retrieval input condition table shown in FIG. 9 and image data retrieved in the optical disk 19 is displayed in the document display window DW. Display of the image data is effected by the document data display section 53 and effected by specifying the function key of "document display" in the retrieval window RW by use of the mouse 29.

In the retrieving section 311, a physical page number corresponding to the logical page number of "1" is derived by referring to the logical page-physical page correspondence table (ST57), and a process of deriving the data length and head address of image data corresponding to the physical page number stored on the optical disk 19 is effected. The information items are transferred to the document data input/output section 55 and image data is read from the optical disk 19 (ST58) and stored into the page memory 14.

In this case, when "document display" is specified by the operator, the head address and data length of image data contained in the file in the optical disk 19 are derived from a result of a request from the retrieving process to the data base section 52. Then, after the retrieval of the file, if "document display" is specified for the first time (ST59), image data of the first page of a corresponding file is displayed (ST60). When the page output order mode is the "logical page number order output mode" as in this embodiment, image data of the first page displayed is the image data having a logical page number registered to be "1" in the file (ST61).

Image data stored in the page memory 14 is controlled by the document data control section 54. In this case, a PMID is attached to the image data stored in the page memory 14, for example, so that it can be identified by the attached PMID.

The retrieving section 311 supplies the PMID to the document data display section 53 so as to display the image data in the document display window DW. In this case, image data corresponding to the PMID is retrieved from the page memory 14 by means of the document data display section 53 and the image data is supplied to the display memory 15. The image data stored in the display memory 15 is displayed on the CRT display 24.

Further, display of the image data on the CRT display 24 is changed to display image data of a next or previous page of the displayed image data by the specification of "next page" or "previous page" as described before.

Finally, the operation of controlling the logical page number and physical page number for each page of the files in the data base section 52 is explained.

Figures 10A, 10B:
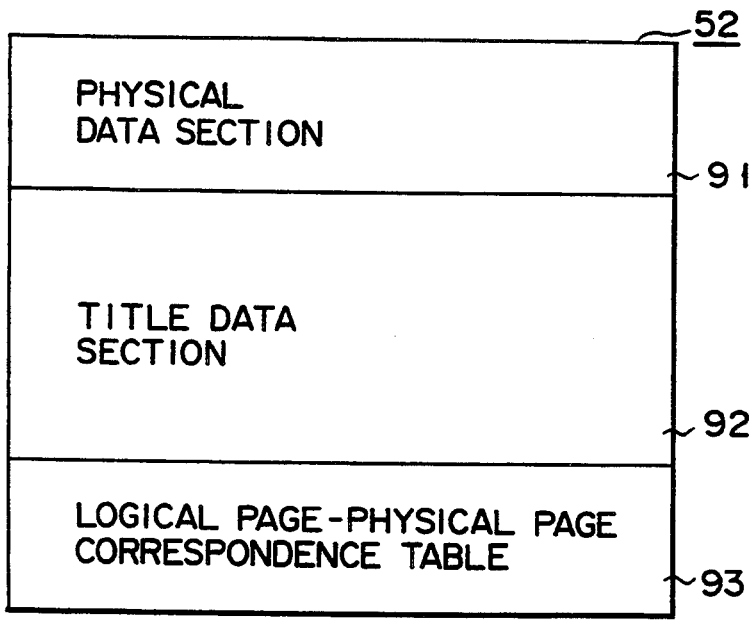
FIG. 10A is a diagram showing an example of a format of retrieval/display data in each file.
FIG. 10B is a diagram showing an example of the result of the registered file checking process effected by the registered file checking section.

FIGS. 10A and 10B show the format of retrieval/display data (control information) in each file in the data base section 52.

The data base section 52 controls physical data, such as the address to and the size of actual data in the file on the optical display 19, the titles attached to the registered files, and a correspondence table indicating the relation between the physical page numbers and logical page numbers of respective pages of the file stored in the optical disk 19.

That is, as shown in FIG. 10A, the retrieval/display data is constructed by a physical data section 91, title data section 92 and logical page-physical page correspondence table 93.

The physical data section 91 contains storage addresses of the image data items' respective file pages on the optical display 19, data size, data density, code/image data identifying flag, data compression system identifying flag in the case of picture image data, and time information such as the year, month and date on which data was registered. The page numbers of respective pages of the file used in the physical data section 91 are set in the order in which image data items are input at the time of registration of the file, and as described before, the page numbers are referred to as the physical page numbers in this embodiment. The information items become necessary when the filing processing section 51 accesses corresponding image data on the optical disk 19 at the time of registration and retrieval.

The title data section 92 contains information associated with the titles of registered files written by the registering section 312 at the registration time. At the time of retrieval of the file, the retrieval section 311 uses the above information.

As described before, the logical page-physical page correspondence table 93 indicates the relation between a desired logical page number and a physical page used in the physical data section 91 for each image data item of each page of the file. The table 93 is formed at the time of registration of the file.

In this embodiment, the logical page number is set as a number (actual page number) described in an area previously specified on the image data to be registered. The area is previously specified by the operator at the time of registration of the file, then data in the specified area is subjected to the character recognition process for each image data item of a file to be input for registration, and a character code obtained from the result of character recognition is set as a logical page number of the image data item. After this, the logical page number is set in the table 93 so as to correspond to the physical page number determined by the input order of the image data items.

Thus, it becomes possible to display respective image data items in the same order as that of the actual page numbers described on the pages, irrespective of the input order of the image data items input at the time of file registration by using the correspondence table 93 (logical page number order output mode) at the time of retrieval and sequentially displaying the image data items in the order of the logical page numbers.

FIG. 10B shows an example of the result of the registered file checking process effected by the registered file checking section 312.

As described above, the registering operation can be continuously effected irrespective of the input order of the image data items. That is, when an abnormal result is obtained in the recognition of a logical page number, a predetermined abnormal logical page number is attached to the image data item. As a result, an error in the input order of image data items can be corrected after registration of all of the image data items is completed. Therefore, even when the image data items of respective pages of the file to be registered are displayed in the same order as the actual order of the pages of the file, the operation of interrupting the process in the middle of the registering operation or the operation of inputting image data again is not necessary.

Further, since only image data items can be displayed based on an abnormal logical page number, time and labor for the operation of checking image data items of all of the pages is reduced.

In addition, since the physical page number will not be removed at the time of registration, image data items can be displayed in the input order after completion of the registration process, and an error, such as page missing which may occur at the time of input of image data, for example, can be easily detected by displaying the image data items in the order of the physical page numbers while collating them with the actual pages of the file used for registration.

In the above embodiment, the logical page-physical page correspondence table is used to set the correspondence of the logical page numbers to the physical page numbers, but it is possible to directly control respective image data items by use of the logical page numbers. That is, use the physical page numbers as addresses to real data items on the optical disk on which corresponding image data is stored. In this case, when image data items of respective pages are displayed, the data can be displayed by using the addresses of the real data items to read out image data items from the optical disk. Further, information for setting the correspondence of the logical page numbers to locations (addresses on the optical disk) at which actual image data items are present can be used.

In the above embodiment, an area used for effecting the character recognition is set only once at the initial time of registration in only one position by the operator in order to derive a logical page number, but in this case, it is supposed that all of the logical page numbers of the file are described in the same area. However, it is possible to easily set a plurality of areas or set areas for respective pages, for example.

Further, in the above embodiment, the character recognition technique is used as a means for deriving logical page numbers, but it is possible to use means capable of deriving numerals which can be dealt with as logical page numbers from the respective pages. For example, it is possible to use means for reading symbols or bar codes representing the logical pages on the respective image data items or permitting the operator to input logical page numbers by use of keys.

Further, a method of effecting the correction in the checking process of the registered file is not limited to three methods described in the above embodiment.

Additional advantages and modifications will readily occur to those skilled in the art. Therefore, the invention in its broader aspects is not limited to the specific details and representative devices shown and described herein. Accordingly, various modifications may be made without departing from the spirit or scope of the general inventive concept as defined by the appended claims and their equivalents.

What is claimed is:

1. A data processing apparatus comprising:
   means for successively inputting image data items that correspond to a plurality of pages, each of the image data items including page information, the page information representing a sequence in which the pages are properly ordered;
   first storing means for storing the inputted image data items;
   means for reading the page information from the inputted image data items;
   second storing means for storing the page information read by the reading means, and for associating the stored page information with data input numbers which represent an order in which the image data items were input by the inputting means;
   means for causing the inputting means to continue to input the image data items, even when the stored page information and the data input number do not match;
   means for retrieving from the first storing means each image data item for which the page information and the data input number do not match;
   means for displaying the image data item retrieved by the retrieving means so as to allow an operator to check a correspondence between the page information and the data input number for each retrieved image data item; and
   means for modifying the retrieved image data item displayed on the displaying means so that the page information and the data input number for each retrieved image data item matches, and for causing the modified image data item to be stored in the first storing means.

2. The data processing apparatus according to claim 1, further comprising means for correcting the page information and the data input number of the retrieved and modified image data item, and updating and storing the corrected page information and data input number in the second storing means.

3. The data processing apparatus according to claim 1, further comprising means for determining a sequence of retrieving image data items from said first storing means based on data in the second storing means.

* * * * *